July 15, 1930.　　　C. F. BEASLEY　　　1,770,640
LOADING APPARATUS
Filed Dec. 4, 1928　　2 Sheets-Sheet 1
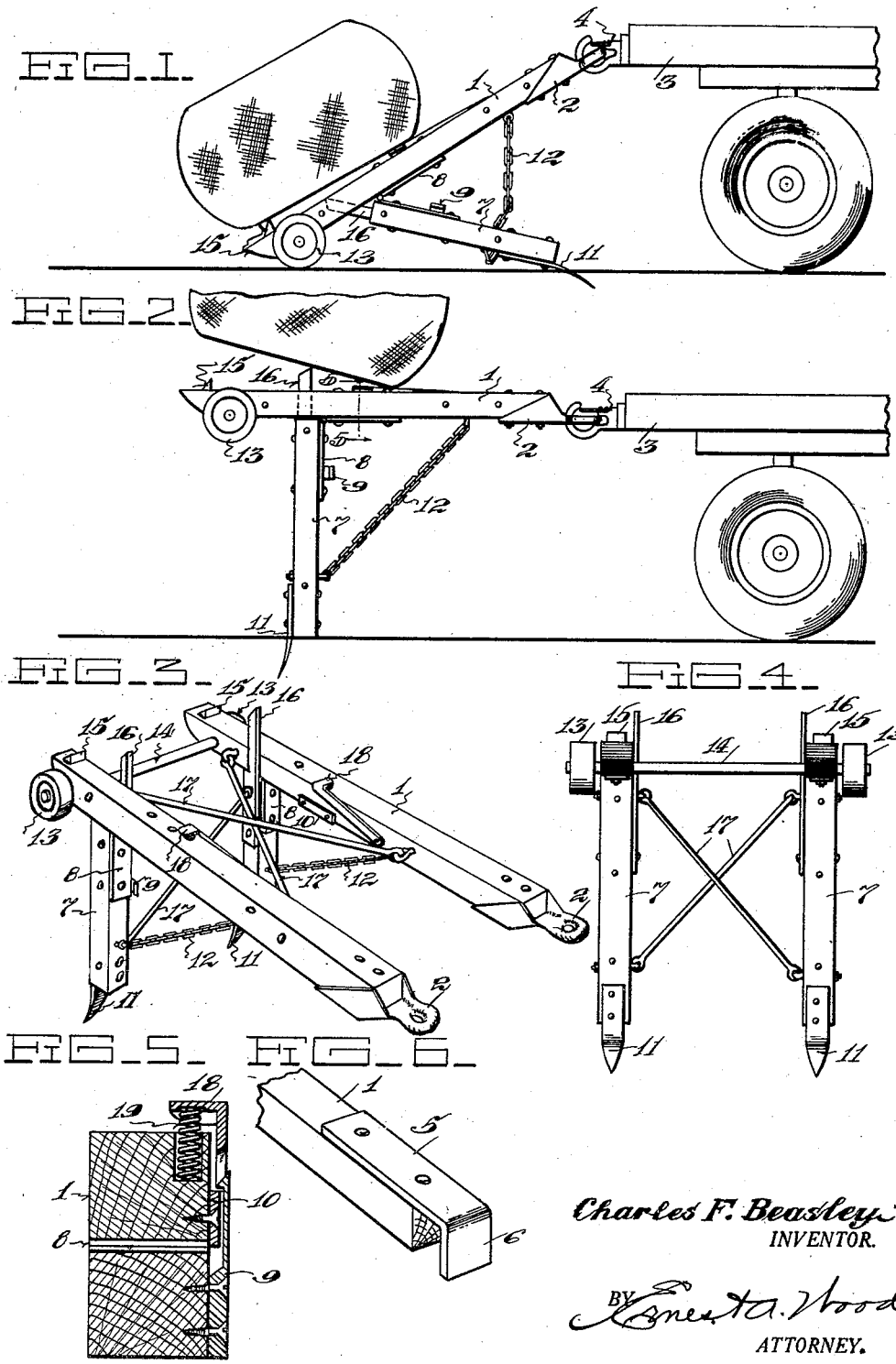
Charles F. Beasley
INVENTOR.
ATTORNEY.

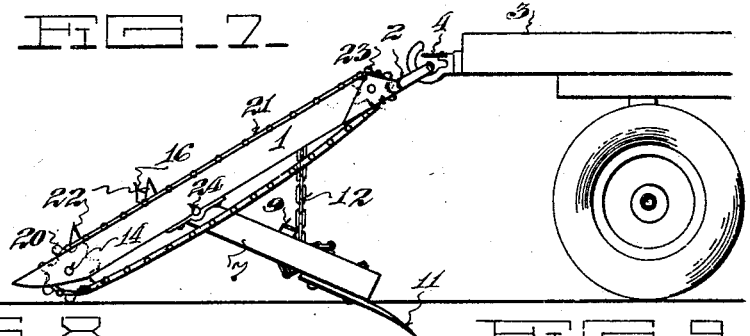
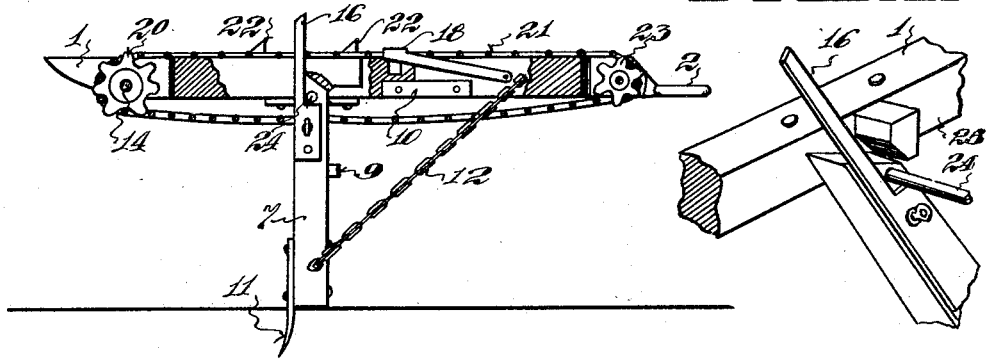
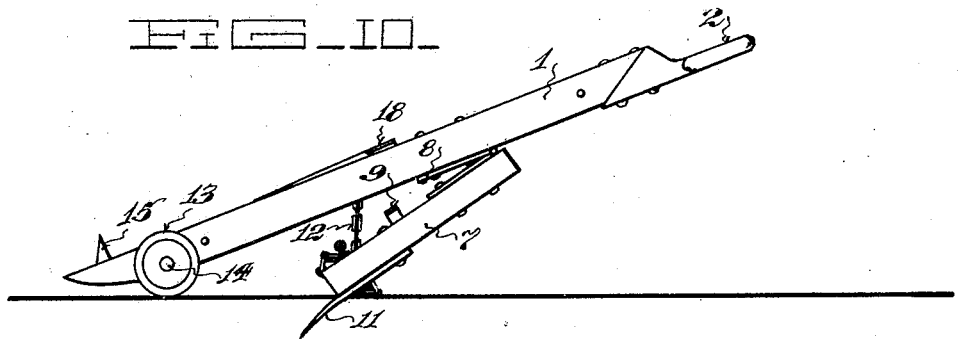
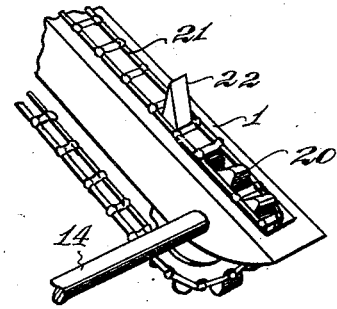
Charles F. Beasley
INVENTOR.
BY Ernest A. Wood
ATTORNEY.

Patented July 15, 1930

1,770,640

UNITED STATES PATENT OFFICE

CHARLES FRANKLIN BEASLEY, OF IOWA PARK, TEXAS

LOADING APPARATUS

Application filed December 4, 1928. Serial No. 323,657.

This invention relates to hoists and loading apparatus and especially to loading apparatus for cotton and other commodities, when an exceptional amount of heavy lifting is necessary to load heavy objects for transportation.

The principal object of the invention resides in the provision of a device which will enable one man to load a bale of cotton or other heavy objects with a minimum amount of effort and, due to its novel arrangement of parts, little or no manual lifting is required to place the object on a truck for transportation.

Another object of the invention resides in the provision of a loading device, simply constructed but embodying highly efficient principles to serve a purpose which has been accomplished heretofore only through combined efforts of two or more men.

Still another object of the invention is manifest in the novel way in which it is constructed to enable the operator to transport the device without disengaging it from the truck to which it is attached, making it a simple matter to collect a load of several bales of cotton or other objects which may be widely separated in various parts of the cotton yard or loading points.

A still further object of the invention is manifest in its ability to reduce accidents to employees which often occur when heavy lifting is required as heavy objects, such as bales of cotton, are unwieldly and difficult to handle.

Having thus set forth the numerous objects and purposes of the invention, a description may be had by reference to the annexed drawings in which:—

Figure 1 is an elevational view showing the invention in receiving position.

Figure 2 is a view showing the invention in raised position.

Figure 3 represents a perspective view showing the coupling means and latch.

Figure 4 is a rear view showing the anchors at the bottom of the legs of the invention.

Figure 5 is a cross sectional view on line 5—5 of Figure 2 showing the latch in detail.

Figure 6 is a fragmentary section showing modified type of coupling.

Figure 7 is an elevational view showing modified version introducing a conveyor chain and sprockets.

Figure 8 is a view showing the inside of frame with portions cut away to show sprockets and a modified arrangement for the legs.

Figure 9 is a fragmentary perspective view of the modified type of leg hinging means.

Figure 10 is an elevational view showing a modified version of the legs to operate in reverse action, and Figure 11 is a fragmentary portion of the frame showing the ground sprocket and chain in detail.

It is known by those familiar with the art that considerable time and expense is necessary in moving large, unwieldy objects and especially baled cotton from the yards to compresses and to shipping points under ordinary conditions and by use of ordinary methods of loading, usually done manually.

A more expeditious and economical method is desirable in handling this commodity and which it is the purpose of this invention to accomplish. Baled cotton is known to be more or less unwieldy in handling and if is not uncommon that an employee is seriously injured by reason of improper loading facilities.

Proceeding more in detail; reference is made to the drawings in which 1 represents the main frame of the skid which is provided with apertured castings 2 at one end for coupling the skid to a truck 3 having corresponding hooks 4 fixed thereon as shown. A modification of this arrangement is shown in Figure 6 which provides a steel strap 5 bent down at the end forming a hook 6 to be received by a U shaped casting (not shown) bolted on the rear of a truck.

It is obvious that unless some means be provided to prevent, the free end of the frame 1 will have a tendency to dig into the ground when the skid is propelled backward which action is necessary in operation. Therefore, casters 13 are mounted on shaft 14 to permit the skid to move freely on the ground either backward or forward. These casters may be used also to trail the skid behind the vehicle from one loading point to another.

When a bale of cotton or other object is placed on the frame as shown in Figure 1 studs 15 hold the object in position until the frame is brought up to the truck level, as shown in Figure 2. Prongs or projections 16 attached rigidly to legs 7 and arranged parallel thereto, protrude above the frame when the skid is in a position as shown in Figure 2 and assists in turning the bale toward the truck.

While the drawing shows the legs 7 only of such length as to elevate the frame to a position even with the truck, it is obvious that if the legs 7 are longer than shown in the drawings, the rear of frame 1 can be raised to a higher position which will, by the assistance of the projections 16 roll the bale or other object toward the truck thereby reducing the amount of handling necessary.

The frame 1 and the legs 7 are braced by means of tie rods 17 which are provided with eyes and are attached to frame and legs by eye bolts. This arrangement is more desirable than rigid bracing due to the terriffic twist and strain on the skid when in use. The flexibility of the tie rods 17 allows for a maximum amount of twist of the frame without causing breakage.

If the legs 7 are raised from the ground and held secure by the spring latches 9 on the frame, the levers 18 on the frame force the latches out of engagement with the bars or keepers 10 when a bale of cotton or other heavy object falls on the frame and depresses the levers 18, which latter will be restored to normal position when released, by means of the springs 19 recessed in frame beneath the levers 18.

It is obvious that a chain and sprockets could also be used on the skid and to accomplish this, the main structure need not be changed. As shown in Figures 7 and 8, a sprocket 20 can be mounted on shaft 14 and recessed within the frame 1 as shown in Figure 10. A chain 21 having legs 22 is adapted to travel along the frame by means of the sprocket 20 and the idler sprocket 23 recessed within the end of the frame opposite the sprocket 20. In operation, the sprocket 20, allowed to rest on the ground as shown in Figure 7, when the skid is urged forward will carry a heavy object progressively up the incline until it has progressed to a point where it will engage the lever 18 to release the legs 7 which are normally held up against the frame by latch 9.

It is sometimes desirable to use a modified arrangement of hinging the legs 7 of the skid to that which has already been described and the provision of a shaft 24 arranged transversely through the frame 1 and the top portion of the legs 7 to pivot them to operate in the same manner as by using the hinge as shown in Figures 1, 2 and 3, and restrained against further movement when they have been brought to a vertical position by a block 25.

While the structure is shown in the drawings to be of wood, no limitations as to material used is intended and it is obvious that considerable modification is possible in the structure shown and described, and such modifications as is considered within the scope and meaning of the appended claims is also considered within the spirit and intent of the invention.

What is claimed is:

1. A loading apparatus including a skid having means to attach same to a truck, foldable legs pivoted to the skid and movable to lie close thereto in one position and in a second position to engage the ground and hold the skid in a substantially horizontal plane, and projections carried by the legs and movable therewith to project above the skid and to engage the load when the legs occupy a position in which same hold the skid horizontal.

2. A loading apparatus including a skid having means to attach same to a truck, foldable legs pivoted to the skid and movable to lie close thereto in one position and in a second position to engage the ground and hold the skid in a substantially horizontal plane, means to latch the legs to the skid and against movement in their said folded position, and means on the skid projecting thereabove and operable by and upon engagement with the load to release said latching means so as to enable the legs to be moved to their said second position.

3. A loading apparatus including a skid having means to attach same to a truck, foldable legs pivoted to the skid and movable to lie close thereto in one position and in a second position to engage the ground and hold the skid in a substantially horizontal plane, a latch carried by the legs, a keeper on the skid to engage the latch, and spring pressed depressible means carried by the skid and normally projecting thereabove and formed to be depressed by and upon engagement with the load to release the latch thereby to enable the legs to be moved to their said second position.

4. A loading apparatus including a skid having means to attach same to a truck, foldable legs pivoted to the skid and movable to lie close thereto in one position and in a second position to engage the ground and hold the skid in a substantially horizontal plane, a latch carried by the legs, a keeper on the skid to engage the latch, a lever pivoted to the skid and having a part to engage and unlatch the latch upon downward movement of the lever, and a spring between the skid and said part of the lever to normally hold said part of the lever above the skid so to be engaged and depressed by the load.

5. A loading apparatus including a skid having means to attach same to a truck, foldable means carried by the skid to hold the latter in substantially horizontal position, means to releasably latch said foldable means in folded position to the skid, and means operable by the load for engaging the latching means to release same and thereby to automatically release the foldable means.

In testimony whereof I affix my signature.

CHARLES FRANKLIN BEASLEY.